July 28, 1931.  F. KLEINSMITH  1,816,289
AUTOMOBILE LICENSE TAG HOLDER
Filed Nov. 22, 1929
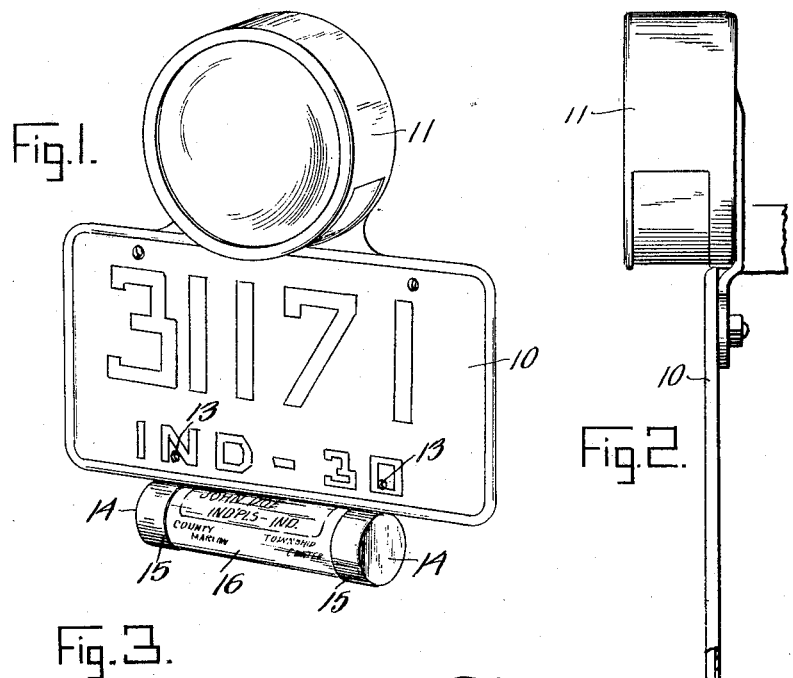
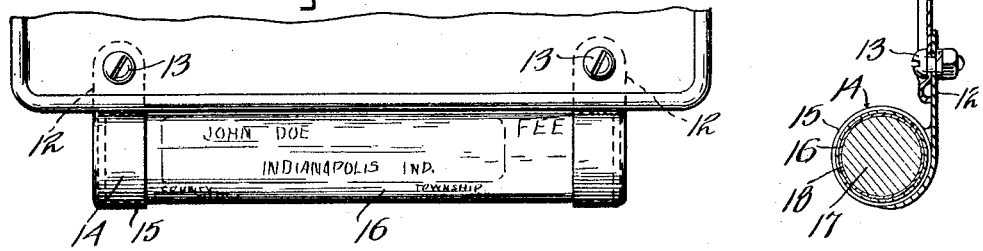
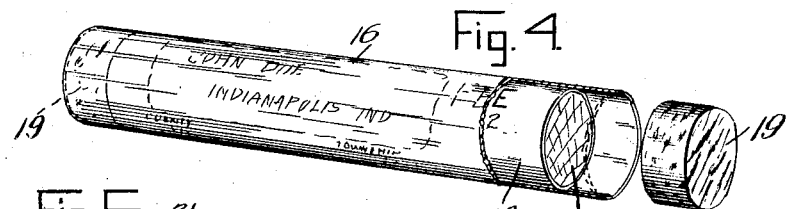
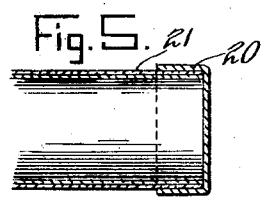
Inventor
Frederick Kleinsmith
By
Attorney Patented July 28, 1931

1,816,289

UNITED STATES PATENT OFFICE

FREDERICK KLEINSMITH, OF INDIANAPOLIS, INDIANA

AUTOMOBILE LICENSE TAG HOLDER

Application filed November 22, 1929. Serial No. 409,133.

The object of my said invention is to provide a simple and inexpensive device adapted to hold an automobile identification card or certificate of title—which may be conveniently and readily attached to the license plate or other appropriate part on an automobile so as to permit the ready inspection of the certificate of title by an officer of the law or any one concerned. By its use the necessity of consulting the police or State records for the purpose of ascertaining the name of the owner of the car and other desired information is avoided thereby effecting a great saving in time and effort to the police and State automobile departments, all as will be hereinafter more fully described and claimed.

Referring to the accompanying drawings which are made a part hereof and on which similar reference characters indicate similar parts, Figure 1 is a perspective view of the device attached to a license plate of an automobile, Figure 2, a side view of the rear light and license plate showing my identification card holder attached thereto, as when in use, Figure 3, an enlarged elevation of the device, Figure 4, a perspective view showing more clearly the construction and arrangement of the parts comprising the holder, and Figure 5 is a modified form of end closure for the cylinder.

In the drawings reference character 10 indicates a motor vehicle license plate secured to a rear light 11 in the usual, or any appropriate manner. Attached to the lower edge 12 of the plate by means of screws, bolts or equivalent fasten-means 13 is a pair of spaced opposed socket supports 14, the flanges 15 of which project toward each other. The supports 14 are spaced apart a distance to permit a cylinder 16 of transparent material, such as celluloid, to be inserted between them and allow it to rotate.

Within the cylinder 16 is a core 17 upon which is rolled a registration card 18. The core 17 is of a length less than that of the cylinder 16 and of a diameter to provide a surface sufficient to completely display the entire card when rolled thereon. In order to prevent displacement of the core and to exclude any foreign matter from the cylinder corks or equivalent end closures 19 are inserted tightly in the ends of the cylinder at each end, or between the ends of the core and the ends of the cylinder.

Instead of the cork 19 shown in Figure 4 I may use a cap 20 which fits over the end of the cylinder 21, as shown in Figure 5.

Thus a very simple device for the purpose is provided and one easily secured to any license plate by simply punching holes and fastening the supports securely thereon. The cylinder and its contents are readily assembled and then placed between the supports. By means of this device ready access to the information on the certificate may be had at all times and the light illuminates the same so that it may be conveniently read at night. By simply turning the cylinder any information concerning the car contained on the certificate may be obtained without loss of time or inconvenience to the driver, owner or other persons at interest.

While I have shown this device as attached to the license plate under the parking light of an automobile so that its use may be enhanced on account of the convenient location in relation to the light, it will be understood, of course, that I do not desire to limit myself to this particular location as it is apparent that there are other parts of an automobile to which this device may be attached without materially impairing its utility.

Wherever the terms "card" or "certificate" are used herein, either in the specification or claims, they are used synonymously and contemplate any certificate or card which may be appropriately used in the device.

It will be obvious to those skilled in the art that various changes may be made in my device without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. In a display device for registration cards or certificate of titles for motor vehicles, a pair of opposed unconnected supports having inwardly projecting flanges, a transparent cylinder rotatably secured between said supports, a core enclosed by said cylinder and sealing elements enclosed within the ends of said cylinder for maintaining smooth bearing surfaces against said supports and to further provide a tight container, substantially as set forth.

2. In a display device for registration cards or certification of titles for motor vehicles, a pair of flanged supports adapted to be mounted on a license plate, a transparent cylinder loosely mounted between said supports, a core enclosed by said cylinder and spaced therefrom adapted to have a card or the like rolled thereon, and corks inserted within and flush with the ends of said cylinder to provide a tight container, substantially as set forth.

3. The combination of an automobile license plate and a display device for registration cards or certificates of title for motor vehicles comprising a pair of supports having socket ends, said supports being pivotally attached to said license plate, a transparent cylinder rotatably secured between said socket ends, and a core enclosed by said cylinder adapted to have a card or the like rolled thereon, substantially as set forth.

In witness whereof, I have hereunto set my hand at Indianapolis, Indiana, this 19th day of November, A. D. nineteen hundred and twenty-nine.

FREDERICK KLEINSMITH.